United States Patent
Loetter et al.

(10) Patent No.: US 7,819,461 B2
(45) Date of Patent: Oct. 26, 2010

(54) CONVERTIBLE TOP WITH TRIM COVERED PANELS

(75) Inventors: Hendrik Loetter, Melle (DE); Dag Reckhorn, West Bloomfield, MI (US)

(73) Assignee: Wilhelm Karmann GmbH, Munich (DE)

(*) Notice: Subject to any disclaimer, the term of this patent is extended or adjusted under 35 U.S.C. 154(b) by 328 days.

(21) Appl. No.: 11/963,228

(22) Filed: Dec. 21, 2007

(65) Prior Publication Data

US 2009/0160224 A1    Jun. 25, 2009

(51) Int. Cl.
*B60J 7/12* (2006.01)
(52) U.S. Cl. ............................... 296/107.15; 296/108
(58) Field of Classification Search ............... 296/103, 296/107.15, 108, 136.07, 136.09, 210, 211
See application file for complete search history.

(56) References Cited

U.S. PATENT DOCUMENTS

| | | | | |
|---|---|---|---|---|
| 1,392,889 A | * | 10/1921 | Day | 442/232 |
| 1,584,518 A | * | 5/1926 | Drake | 150/166 |
| 1,640,592 A | * | 8/1927 | Bourgon | 296/211 |
| 2,048,461 A | * | 7/1936 | Mosgoffian | 150/166 |
| 2,479,825 A | * | 8/1949 | Fleischhauer | 52/3 |
| 2,619,919 A | * | 12/1952 | Dvorkin | 52/3 |
| 2,765,192 A | * | 10/1956 | Blake | 296/107.01 |
| 3,241,877 A | * | 3/1966 | Voyd | 296/136.09 |
| 3,846,200 A | * | 11/1974 | Doerfling et al. | 156/85 |
| 4,634,171 A | * | 1/1987 | McKeag | 296/108 |
| 4,699,420 A | * | 10/1987 | Priest et al. | 296/210 |
| 5,009,938 A | * | 4/1991 | Raj | 428/31 |
| 5,033,788 A | * | 7/1991 | Raj | 296/136.09 |
| 5,207,474 A | | 5/1993 | Licher et al. | |
| 5,429,409 A | | 7/1995 | Corder et al. | |
| 5,654,615 A | * | 8/1997 | Brodsky | 318/282 |
| 5,829,821 A | * | 11/1998 | Aydt et al. | 296/122 |
| 5,988,729 A | | 11/1999 | Klein et al. | |
| 6,120,087 A | * | 9/2000 | Lake | 296/136.09 |
| 6,135,535 A | * | 10/2000 | Tarahomi | 296/102 |
| 6,422,637 B1 | * | 7/2002 | Mac Farland | 296/107.15 |
| 6,439,642 B2 | | 8/2002 | Mac Farland et al. | |
| 6,796,597 B2 | * | 9/2004 | Mac Farland | 296/108 |
| 7,021,695 B2 | * | 4/2006 | Quindt et al. | 296/107.12 |
| 7,118,161 B2 | | 10/2006 | Neubrand | |
| 7,377,574 B2 | * | 5/2008 | Richter et al. | 296/107.15 |
| 2007/0158971 A1 | * | 7/2007 | Kreiling | 296/107.01 |

FOREIGN PATENT DOCUMENTS

| | | | |
|---|---|---|---|
| DE | 3526694 | | 2/1987 |
| GB | 2229152 A | * | 9/1990 |
| JP | 02306822 A | * | 12/1990 |

* cited by examiner

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A convertible top includes a plurality of panel assemblies movably coupled to each other for movement between a closed position in which the panel assemblies are arranged end to end to cover a passenger compartment of a motor vehicle and an open position in which the panel assemblies are disposed in a storage space adjacent the passenger compartment. Each of the panel assemblies has an outer surface and a fabric trim cover separate from the other of the panel assemblies. The trim covers remain along the outer surface during movement of the top between the closed position and the open position.

8 Claims, 3 Drawing Sheets

CONVERTIBLE TOP WITH TRIM COVERED PANELS

FIELD OF THE INVENTION

The invention relates to convertible tops for motor vehicles. More particularly, the invention relates to a convertible top having panels each individually covered by a respective fabric trim cover.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moonroofs are some of the simplest designs and offer the opportunity to open a portion of the vehicle roof for increased airflow. More complicated designs allow the entire roof structure to be retracted and stored behind the passenger compartment.

Retractable roof systems generally fall into two categories. The most common type of retractable roof design is a convertible soft top or roof. These designs include an articulating structural framework with a flexible cloth or plastic outer skin. In an extended position, the front end of the articulating framework connects to a header above the vehicle windshield and the outer skin extends over the passenger compartment. When retracted, the articulating mechanism, along with the outer skin, folds into a compact shape. While convertible soft tops offer the choice between a covered or uncovered passenger compartment, they also suffer from several disadvantages in comparison to traditional rigid roof structures. Vehicles with soft tops are typically less well sealed against the elements and road noise. They are also less resistant to break-in attempts and have a less finished interior appearance.

The other retractable roof design is a retractable or folding hardtop roof system. Retractable hardtops consist of one or more rigid roof elements that are mechanically articulated such that they can be repositioned into a storage area behind the passenger compartment. Because the retractable hardtop consists of rigid sections, the system can provide a much closer approximation of a traditional rigid roof structure. In the extended position, a retractable hardtop securely covers and seals the passenger compartment, giving the appearance of a permanent roof. A retractable hardtop does a significantly better job of sealing the passenger compartment, reducing noise, and preventing break-ins.

In some markets, the look or appearance of a soft convertible top is desired. It remains desirable to provide a convertible top design which utilizes rigid roof elements and provides the appearance of a soft convertible top.

SUMMARY OF THE INVENTION

According to one aspect of the invention, a convertible top for a motor vehicle includes a plurality of panel assemblies movably coupled to each other for movement between a closed position in which the panel assemblies are arranged end to end to cover a passenger compartment of a motor vehicle and an open position in which the panel assemblies are disposed in a storage space adjacent the passenger compartment. At least a rearmost panel assembly of the plurality of panel assemblies is a substantially rigid panel. Each of the panel assemblies has an outer surface and fabric trim cover separate from the other of the panel assemblies. The fabric trim cover covers the outer surface.

According to another aspect of the invention, a convertible top for a motor vehicle includes a first panel assembly and a second panel assembly. The first panel assembly has a first substrate and a first fabric trim cover disposed along an outer surface of the first substrate. The second panel assembly has a second substrate and a second fabric trim cover disposed along an outer surface of the second substrate. The first and second panel assemblies are movably coupled to each other for movement between a closed position in which the panel assemblies are arranged end to end to cover a passenger compartment of a motor vehicle and an open position in which the panel assemblies are disposed in a storage space adjacent the passenger compartment. The first and second fabric trim covers remain disposed along the outer surfaces of the respective first and second substrates during the movement of the top between the closed and open positions.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
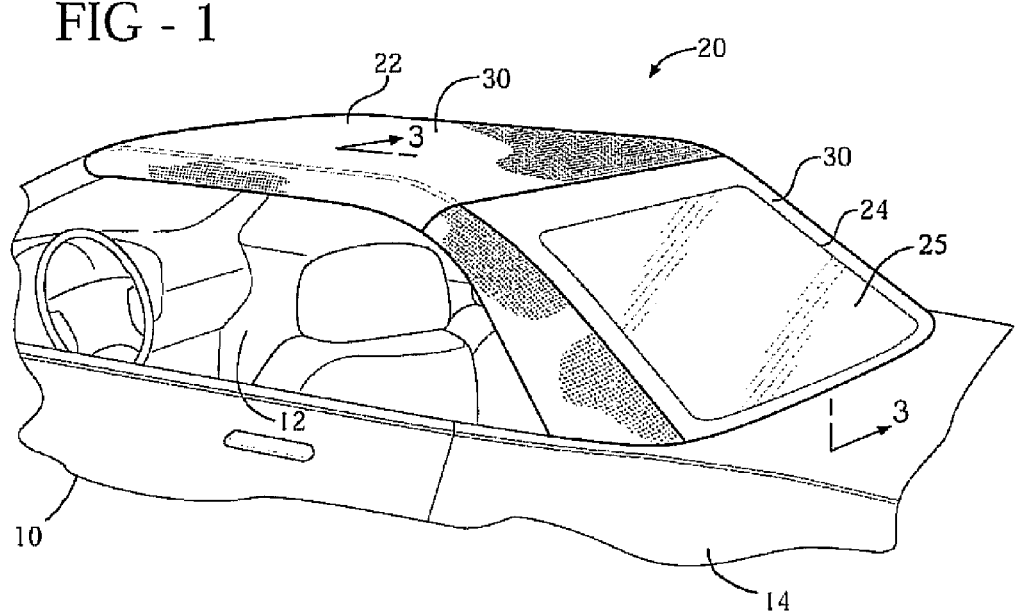
FIG. 1 is a perspective view of a convertible top motor vehicle according to one embodiment of the invention with the convertible top shown in the closed position.
Figure 2:
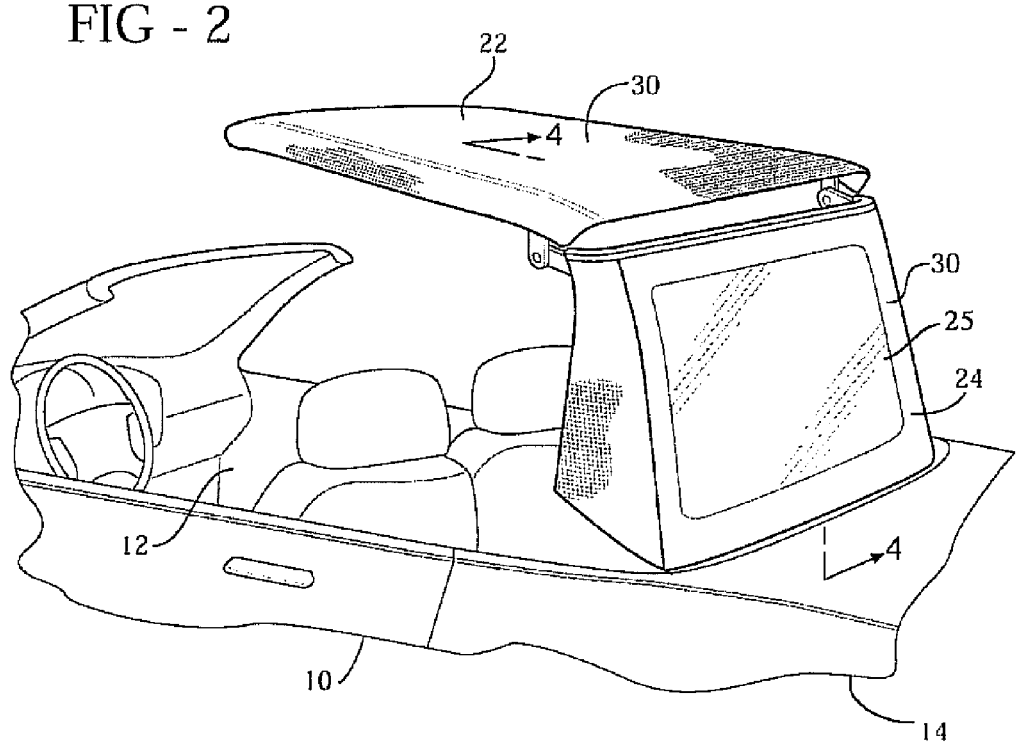
FIG. 2 is a perspective view of the motor vehicle with the top shown in a partially open position.
Figure 3:
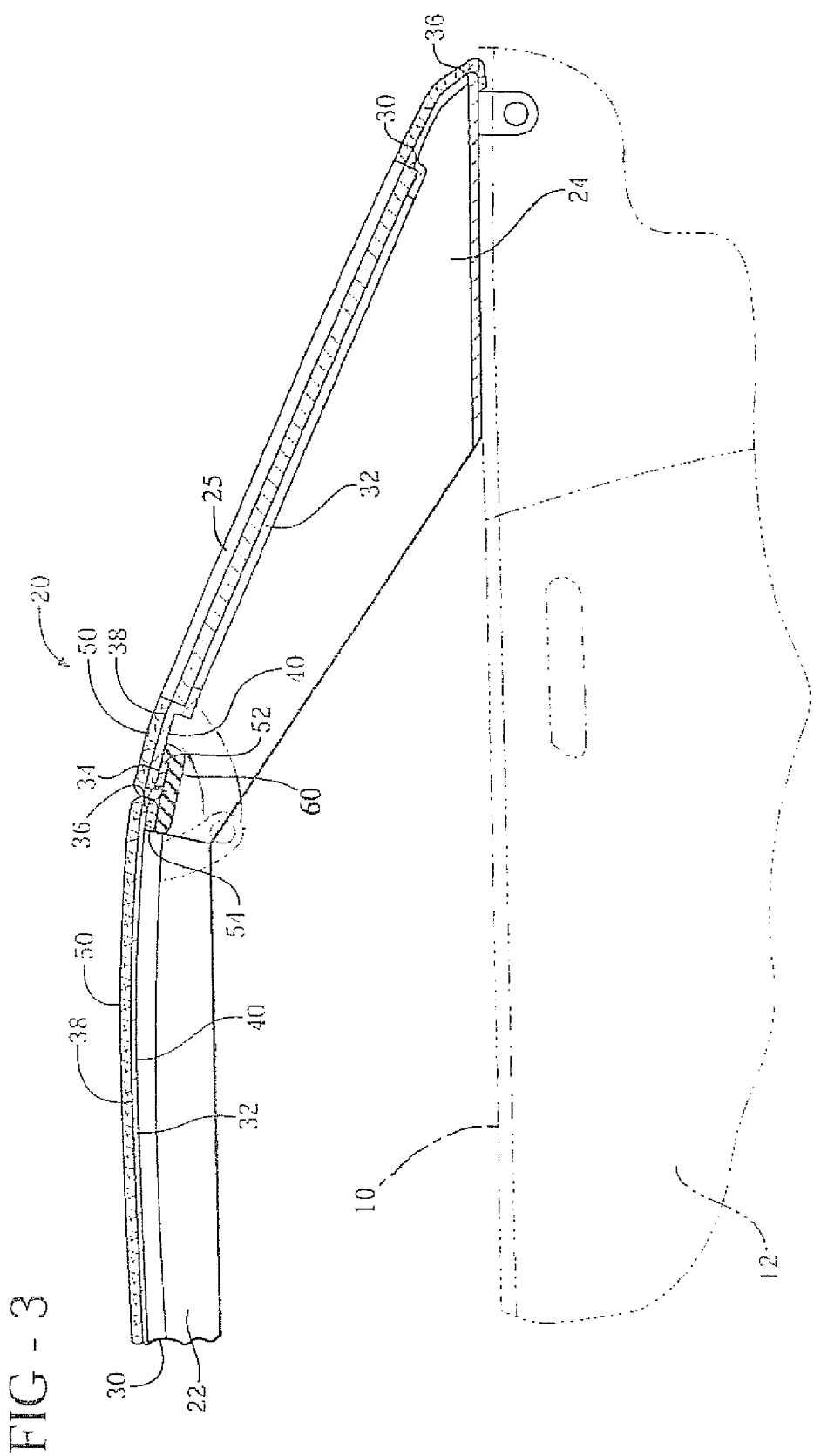
FIG. 3 is a cross sectional view of the motor vehicle as taken along a plane indicated at 3-3 in FIG. 1.
Figure 4:
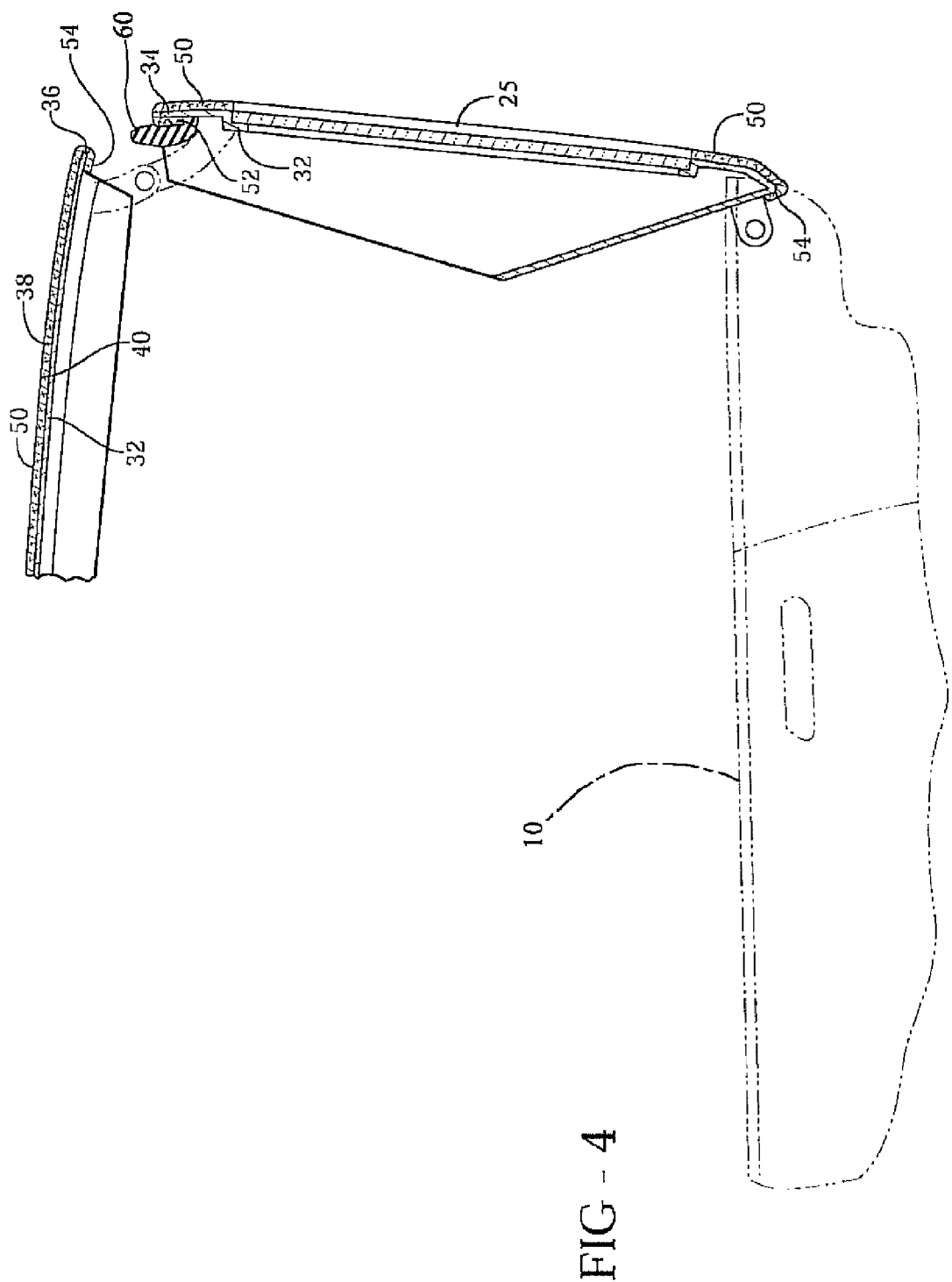
FIG. 4 is a cross sectional view of the motor vehicle as taken along a plane indicated at 4-4 in FIG. 2.

Referring to the figures, a convertible top for a motor vehicle 10 is generally indicated at 20. The top 20 is movable between a closed position covering a passenger compartment 12 in the vehicle 10 and an open position retracted into storage space 14 adjacent to the passenger compartment 12. The top 20 includes a plurality of panel assemblies 30 movably coupled to each other for movement between the closed position, in which the panel assemblies 30 are arranged end to end covering the passenger compartment 12, and an open position, in which the panel assemblies 30 are disposed in the storage space 14 adjacent the passenger compartment 12.

In one embodiment, at least a rearmost panel assembly 24 of the plurality of panel assemblies 30 includes a substantially rigid substrate 32. The remaining panel assemblies 30 forward of the rearmost panel assembly 24 may include a substantially rigid substrate or an "open" rigid frame structure. In the illustrated embodiment, the rearmost panel assembly includes a rear window 25 disposed therein.

In the illustrated embodiment, a front panel assembly 22 of the plurality of panel assemblies 30 is pivotally coupled to the rear panel assembly 24 in a "clamshell" arrangement for movement between the closed and open positions.

In the illustrated embodiment, each panel assembly 30 includes a dimensionally stable substrate 32 formed to provide the general overall shape of the panel assembly 30. Each substrate 32 has upper 38 and lower 40 surfaces that extend between opposite front 34 and rear ends 36 thereof. Each panel assembly 30 also includes a respective fabric trim cover 50 for substantially covering the upper surface 38. Each fabric trim cover 50 has opposite and spaced apart front 52 and rear 54 edges.

In the illustrated embodiment, the front 52 and rear 54 edges of the fabric trim cover 50 are wrapped around the respective front 34 and rear 36 ends of the substrate 30 and secured to the lower surface 40 of the substrate 30. The fabric trim cover 50 may be formed of woven or non-woven textile, vinyl, leather or other suitable flexible materials known by persons having ordinary skill in the art.

The fabric trim cover 50 extends along the upper surface 38 of the substrate 32. The fabric trim cover 50 is tensioned against and/or fixedly secured to the upper surface 38 of the substrate 32. By this arrangement, the fabric trim cover 50 remains adjacent to the upper surface 38 of the substrate 32 during movement of the top 20 between the closed and open positions.

A flexible seal 60 is disposed along an end 34 of one of the panel assemblies 30 for providing a seal between adjacent panel assemblies 30 in the closed position. Further, any suitable water drainage arrangement known by those skilled in the art may be used for directing water away from a gap between adjacent panel assemblies to prevent water from entering the passenger compartment.

The invention has been described in an illustrative manner. It is, therefore, to be understood that the terminology used is intended to be in the nature of words of description rather than of limitation. Many modifications and variations of the invention are possible in light of the above teachings. For example, the panel assemblies of the top may be movably coupled to each other in any suitable way known by those having ordinary skill in the art, such as by a simple pivot, multi-link hinges and/or slidable coupling. Further, the top may be power actuated or manually operated. Further still, more than two panel assemblies for the top may be utilized. Thus, within the scope of the appended claims, the invention may be practiced other than as specifically described.

We claim:

1. A convertible top comprising:
a plurality of panel assemblies being movably coupled to each other for movement between a closed position in which the panel assemblies are arranged end to end to cover a passenger compartment of a motor vehicle and an open position in which the panel assemblies are disposed in a storage space adjacent the passenger compartment, at least a rearmost panel assembly of the plurality of panel assemblies being a substantially rigid panel;
each of the panel assemblies having an outer surface and a fabric trim cover separate from the other of the panel assemblies, each fabric trim cover covering a substantial portion of the outer surface of one of the panel assemblies, each of the panel assemblies and fabric trim covers having a perimeter and a central area, each fabric trim cover having an inner surface, the inner surface of the central area of each of the fabric trim covers being fixedly secured to the outer surface of one of the panel assemblies.

2. A convertible top as set forth in claim 1, wherein the perimeters of each of the fabric trim covers are aligned with the perimeters of the respective panel assemblies.

3. A convertible top as set forth in claim 1, wherein the plurality of panel assemblies comprise a front panel assembly and the rearmost panel assembly, the front panel assembly being pivotally coupled to the rearmost panel assembly such that the panel assemblies clamshell together when disposed in the storage space.

4. A convertible top as set forth in claim 1, wherein the rearmost panel assembly has a rear window disposed therein.

5. A convertible top as set forth in claim 1, wherein the fabric trim covers are made from a textile material.

6. A convertible top as set forth in claim 1, wherein the fabric trim covers are made from a vinyl material.

7. A convertible top as set forth in claim 1, wherein each of the panel assemblies has a front end and an opposite rear end, at least one of the fabric trim covers having a front edge and an opposite rear edge, the front and rear edges of the fabric trim cover being generally aligned with the front and rear ends of the respective panel assembly.

8. A convertible top as set forth in claim 7, wherein the panel assembly each include a substrate defining the outer surface, and portions of the fabric trim cover along the front and rear edges are wrapped around the respective front and rear ends of the substrate and secured to a lower surface of the substrate.

* * * * *